United States Patent [19]

Okamura et al.

[11] Patent Number: 5,153,247
[45] Date of Patent: Oct. 6, 1992

[54] INJECTION-MOLDED PRODUCT WITH SUPERIOR DIMENSIONAL PRECISION

[75] Inventors: Michiya Okamura; Hiroshi Yui; Takeshi Hatakeyama; Michio Ohmori; Kouich Sagisaka; Kazuyuki Hata; Katsuhiko Yamada; Kazuhide Hayama, all of Yokkaichi, Japan

[73] Assignee: Mitsubishi Petrochemical Co., Ltd., Tokyo, Japan

[21] Appl. No.: 804,533

[22] Filed: Dec. 11, 1991

Related U.S. Application Data

[63] Continuation of Ser. No. 549,274, Jul. 6, 1990, abandoned.

[30] Foreign Application Priority Data

Jul. 21, 1989 [JP] Japan ................... 1-187413
Nov. 13, 1989 [JP] Japan ................... 1-292379
Jun. 18, 1990 [JP] Japan ................... 2-157689

[51] Int. Cl.$^5$ .................. C08J 5/08; C08K 5/34; C08L 27/10
[52] U.S. Cl. .................. 524/101; 524/420; 524/502; 524/513; 524/494
[58] Field of Search .............. 524/101, 420, 502, 513, 524/494

[56] References Cited

U.S. PATENT DOCUMENTS

| | | | |
|---|---|---|---|
| 4,180,496 | 12/1979 | Yanagimoto et al. | 260/45.8 NT |
| 4,741,864 | 5/1988 | Avakian et al. | 524/281 |
| 4,772,655 | 9/1988 | Krishnan et al. | 524/437 |

OTHER PUBLICATIONS

Chemical Abstracts, vol. 105, No. 14, Oct. 6, 1986, Columbus, Ohio, US; Abstract No. 115857p, S. S. Parikh, et al: "Zinc Sulfide vs. Titantium Dioxide in Reinforced Thermoplastics" p. 30; & Plast. Compd. 1985, 8(4), 50, 52, 55 (Eng.).

Primary Examiner—Paul R. Michl
Assistant Examiner—U. K. Rajguru
Attorney, Agent, or Firm—Oblon, Spivak, McClelland, Maier & Neustadt

[57] ABSTRACT

There is disclosed a polycarbonate composition which comprises having a melt flow rate of 5 to 50 g/10 min and composed of:
(a) 30 to 65 parts by weight of a thermoplastic aromatic polycarbonate,
(b) 70 to 35 parts by weight of glass fibers with an average diameter of 3 to 15 μm, and
(c) 0.01 to 15 parts by weight of at least one component selected from the group consisting of (c-1) to (c-3) shown below formulated therein based on 100 parts by weight of the total amount of (a) and (b):
(c-1) 0.3 to 10 parts by weight of a brominated polystyrene with an average particle size of 0.1 to 50 μm;
(c-2) 0.3 to 10 parts by weight of zinc sulfide with an average particle size of 0.1 to 50 μm; and
(c-3) 0.01 to 5 parts by weight of a melamine-cyanuric acid adduct with an average particle size of 0.1 to 50 μm.

19 Claims, No Drawings

INJECTION-MOLDED PRODUCT WITH SUPERIOR DIMENSIONAL PRECISION

This application is a continuation of application Ser. No. 07/549,274, filed on Jul. 6, 1990, now abandoned.

BACKGROUND OF THE INVENTION

This invention relates to a resin composition excellent in mechanical characteristics, having dimensional precision with little anisotropy and dimensional stability to environmental temperature demanded for precise electronic parts.

In recent years, with spreading of office automation instruments such as office computers and word processors, printers which are output terminals are becoming to be demanded to have higher functions and higher performances.

For example, various housings having optical parts (e.g. lenses) built therein are demanded to have excellent dimensional stability and tough mechanical characteristics.

In the prior art, as the material in such a field, there have been used aluminum alloys and thermosetting resins.

However, these base materials are heavy and also inferior in productivity in working, requiring various kinds of secondary working, thus involving various drawbacks such as high cost.

For this reason, there has been created a strong need in the market for a thermoplastic resin which is light in weight, and also excellent in productivity and low in cost.

However, a composite material obtained by modifying a thermoplastic resin of the prior art could not be practically applied as the material for parts for which high degree of dimensional stability is demanded, because anisotropy of linear expansion is great.

SUMMARY OF THE INVENTION

An object of the present invention is to provide a composition which has solved such problems.

The present inventors have intensively investigated in view of these situations, and consequently found that a composition of a polycarbonate formulated with specific glass fibers and a specific third component in specific amounts, and also controlled in melt flow property is a reinforced resin satisfying the desired extremely high degree of dimensional stability, to accomplish the present invention.

More specifically, the present invention is a polycarbonate composition having a melt flow rate of 5 to 50 g/10 min. comprising:

(a) 30 to 65 parts by weight of a thermoplastic aromatic polycarbonate, (b) 70 to 35 parts by weight of glass fibers with an average diameter of 3 to 15 $\mu$m and (c) 0.01 to 15 parts by weight of at least one component selected from the group consisting of (c-1) to (c-3) shown below formulated therein based on 100 parts by weight of the total amount of (a) and (b):

(c-1) 0.3 to 10 parts by weight of a brominated polystyrene with an average particle size of 0.1 to 50 $\mu$m;

(c-2) 0.3 to 10 parts by weight of zinc sulfide with an average particle size of 0.1 to 50 $\mu$m;

(c-3) 0.01 to 5 parts by weight of a melamine-cyanuric acid adduct with an average particle size of 0.1 to 50 $\mu$m.

DESCRIPTION OF THE PREFERRED EMBODIMENTS

The thermoplastic aromatic polycarbonate of the above component (a) to be used in the present invention is also inclusive of its modified product, and the dihydroxy compound constituting the polycarbonate comprises one having two phenolic hydroxyl groups. Specific examples of such divalent phenol may include bisphenols, particularly bisphenol A.

The aromatic polycarbonate may be prepared by the reaction of the above-mentioned divalent phenol with phosgene, bischloroformate, carbonic acid diester, but suitable products are also available in the market. As the modified product, there may be included polycarbonates blended with acrylo-nitrile-butadiene-styrene ternary copolymer resins, or polycarbonates modified according to such a method as impregnation of pellets of polycarbonate with styrene monomer, followed by polymerization.

Next, the glass fibers which is the above-mentioned component (b) to be used in the present invention have an average diameter of 3 to 15 $\mu$m, preferably 5 to 10 $\mu$m. This material desirably has an average length of 0.05 to 3 mm under the state existing in the melted and kneaded composition.

Those with an average diameter outside of this range can give no sufficient mechanical strength and dimensional precision of the composition, and those with an average length outside of this range are liable to be poorly dispersed, and also tend to give no sufficient dimensional precision of the composition.

The glass fibers may be prepared according to, for example, the method in which marbles (glass beads with predetermined dimensions) are softened by heating in bushing (fiber collecting furnace), permitted to flow down through a large number of nozzles of said furnace table, attaching a sheafing agent by impregnation by means of a sheafing agent coating device while stretching the base material with a high speed, drying and taking up the fiber on a rotating drum. The average diameter of the glass fiber can be determined by choosing the nozzle diameter dimension and the stretching conditions.

The form of the glass fiber may be any of roving, chopped strand and strand, and also pulverized product of the strand such as so-called milled fiber and glass powder may be employed. However, for mixing workability with the resin, chopped strand is preferred. The composition of the starting glass may be preferably one containing no alkali, and E glass may be mentioned as an example.

Further, the above-mentioned specific third component (c) to be used in the present invention is at least one component selected from the group consisting of (c-1) a brominated polystyrene with an average particle size of 0.1 to 50 $\mu$m; (c-2) zinc sulfide with an average particle size of 0.1 to 50 $\mu$m; and (c-3) a melamine-cyanuric acid adduct with an average particle size of 0.1 to 50 $\mu$m.

The brominated polystyrene with an average particle size of 0.1 to 50 $\mu$m is a polystyrene partially substitiued with bromine, preferably one with a bromine content of 50 to 80%. A preferred average particle size is spherical fine particle of 1 to 30 $\mu$m. Also, preferred zinc sulfide is a fine particle with an average particle size of 0.2 to 20 μm.

The zinc sulfide particles can be applied to surface treatment with an organic compound having a hydrophilic group and a hydrophobic group for enhancing dispersibility into a resin. Specifically, they can be surface treated with a surface treating agent such as a fatty acid, a fatty acid metal salt and ethanolamine.

On the other hand, a preferred average particle size of the melamine-cyanuric acid adduct is 0.2 to 30 μm.

The melamine-cyanuric acid adduct of the above-mentioned component (c-3) to be used in the present invention is a melamine-cyanuric acid adduct obtained by, for example, reacting melamine with cyanuric acid or isocyanuric acid in an aqueous medium. Particularly, a melamine-cyanuric acid adduct subjected to surface treatment obtained by using a substantially homogeneous solution containing an organic solvent as an aqueous medium and a surface treating agent for melamine-cyanuric acid adduct is preferred. Such preparation method is proposed in, for example, Japanese Provisional Patent Publication No. 260849/1989.

The kind of the surface treating agent used depends greatly on the resin component in which the melamine-cyanuric acid adduct is formulated. Generally speaking, a polymer similar to the resin component in which the melamine-cyanuric acid adduct is formulated is suitable, but it is not limited to those similar to the resin component to be formulated, provided that the melamine-cyanuric acid adduct subjected to surface treatment and the resin in which it is to be formulated have good compatibility and can be uniformly dispersed.

In the present invention, it is particularly preferred to use a melamine-cyanuric acid adduct subjected to surface treatment by using a polycarbonate as the surface treating agent.

The concentration of the surface treating agent in the organic solvent is not particularly limited, provided that it is a concentration capable of being dissolved in the solvent and forming thinly a uniform coating (with a thickness of about 0.001 to 0.5 μm) of the surface treating agent on the surface of the melamine-cyanuric acid adduct, and may be preferably 1 to 50% by weight based on the organic solvent.

This reaction is generally carried out under normal pressure. The reaction temperature, which may also differ depending on the solvent employed, is most preferably the boiling point of the solvent, because the reaction rate is too slow at normal temperature.

The reaction time, which depends on the reaction temperature, may be about 2 hours when the reaction temperature is 50° to 60° C., and about one hour when the reaction temperature is 80° to 90° C.

When such melamine-cyanuric acid adduct is employed, particularly in addition to good dimensional stability and mechanical characteristics, the effect of dramatic improvement of moldability is also exhibited. Accordingly, by adding this only in a small amount, an article with a complicated shape can be well molded.

The third components (c-1) to (c-3) with average particle sizes less than those as specified above can be dispersed into the resin with difficulty, while those in excess of the above ranges have little improved effect of dimensional precision.

The formulation ratios of the above three components which are the essential components of the present invention are: based on total 100 parts by weight of the components (a) and (b), 30 to 65 parts by weight, preferably 40 to 60 parts by weight of the component (a);

35 to 70 parts by weight, preferably 40 to 60 parts by weight of the component (b); and the amount of at least one component selected from the group consisting of the components (c-1) to (c-3) shown below:

0.3 to 10 parts by weight, preferably 1 to 8 parts by weight of the component (c-1);

0.3 to 10 parts by weight, preferably 1 to 8 parts by weight of the component (c-2); and 0.01 to 5 parts by weight, preferably 0.01 to 3 parts by weight of the component (c-3).

Here, an upper limit of the component (c) comprising at least one component selected from the components (c-1) to (c-3) is 15 parts by weight based on the 100 parts by weight of the total weight of the components (a) and (b), and the lower limit is 0.01 part by weight based on the same.

A composition with a formulated amount of the component (b) less than the above range, namely with an excessive amount of the component (a) has a great absolute value of linear expansion ratio, lacking high degree of dimensional precision, while one exceeding the above range, namely with too little amount of the component (a) can be molded with difficulty.

A composition with a formulated amount of the component (c) less than each range as specified above, anisotropy of linear expansion ratio occurs to give no high degree of dimensional precision, while one in excess of the above range is weakened in mechanical strength, particularly impact strength.

In the composition of the present invention, in addition to these components, other additional components can be also formulated within the range which does not markedly impair the effect of the present invention. Examples of additional components may include various fillers other than the above-mentioned components, for example, a filler such as carbon black, calcium carbonate (heavy, light, colloidal), talc, mica, silica, alumina, aluminum hydroxide, magnesium hydroxide, barium sulfate, zinc oxide, zeolite, wallastonite, diatomaceous earth, glass beads, bentonite, montmorillonite, asbestos, hollow glass beads, graphite, molybdenum disulfite, titanium oxide, carbon fiber, aluminum fiber, stainless steel fiber, brass fiber, aluminum powder, wood powder and chaff; and otherwise thermoplastic resins such as polypropylene, polyethylene (high density, medium density, low density, linear low density), polyamide, polyethylene terephthalate, polybutylene terephthalate, propylene-ethylene block or random copolymer, maleic anhydride-modified polyolefin, rubber or latex component, such as ethylene-propylene copolymer rubber, styrene-butadiene rubber, styrene-butadiene-styrene block copolymer or hydrogenated derivatives thereof, polybutadiene and polyisobutylene; thermosetting resins such as epoxy resin, malemine resin, phenol resin, unsaturated polyester resin; antioxidants (phenol type and sulfur type), lubricants, various organic or inorganic type pigments, UV-ray absorbers, antistatic agents, dispersing agents, neutralization agents, foaming agents, plasticizers, copper harm preventives, flame retardants, crosslinking agent and flowability improvers.

Addition of these additional components is effective for improvement of physical property balance or surface characteristics of molded articles (surface damage receiving resistance, luster, weld appearance, silver streak and flow mark), printability, coatability, adhesiveness, platability, moldability and durability.

Among them, particularly carbon black is related unexpectedly with dimensional precision in the present invention.

More specifically, by addition of 0.1 to 6 parts by weight of, preferably 0.3 to 4 parts by weight of carbon black based on 100 parts by weight of the total amount of the above-mentioned components (a) and (b), it becomes easier to control flowability, thereby acting better for cancellation of anisotropy of linear expansion ratio, whereby a composition with high degree of dimensional precision can be obtained and also lowering of impact resistance is a little.

As carbon black, carbon blacks in general such as furnace black, channel black and acetylene black can be used either singly or in combination.

Particularly, as a preferred carbon black, acetylene black with little polar functional group at the surface and small specific surface area is preferred with respect to little inhibition of flowability of the polymer.

The composition of the present invention can be prepared by using a conventional kneading machine such as a single screw extruder, a twin screw extruder, a Banbury mixer, rolls, a brabender-plastograph and a kneader.

Generally, the above essential component and, if desired, additional components are kneaded by an extruder to be formed into a compound in pellets, which are provided for processing, but in a special case, the respective components can be fed directly into a molding machine and can be molded while kneading the present composition in a molding machine. Also, the components (b) and (c) may be previously kneaded at high concentrations to prepare a masterbatch, which can be subjected to blend compounding while being diluted with other components such as the component (a), or may be also directly molded.

The composition of the present invention can be molded by means of a conventional molding machine for thermoplastic resin. That is, it can applied to injection molding, extrusion molding, hollow molding and thermal molding.

The composition of the present invention thus obtained has a melt flow rate (MFR) of 5 to 50 g/10 min, preferably 8 to 40 g/10 min, particularly preferably 8 to 20 g/10 min. The composition outside of this range is unsatisfactory in the dispersed state of the component (b) in relationship with flowability, whereby sufficient dimensional precision can be hardly obtained.

The composition of the present invention, particularly also in injection molding, has little anisotropy of linear expansion ratio, because all the glass fibers dispersed are not oriented in the injection direction, and therefor has the characteristic of extremely small lowering in dimensional stability and mechanical strength to the change in environmental temperature.

The composition of the present invention thus obtained has enabled application to precise electronic parts demanding high degree of dimensional characteristics, on which thermoplastic resins of the prior art could not embark.

EXAMPLES 1 TO 4

A polycarbonate, glass short fibers with an average diameter of 9 μm and an average length of 1.5 mm, brominated polystyrene fine particles with an average particle size of 1 μm and a bromine content of 65% by weight and acetylene black were blended at various ratios and then formed into pellets by kneading through a twin screw extruder. The average length of the glass fibers in the pellets was found to be 0.3 mm. The resulting pellets were molded into test strips by means of a screw in-line type injection molding machine for evaluation of physical properties. The results are shown in Table 1.

The compositions of Examples had lateral/longitudinal ratios of linear expansion ratio extremely approximate to 1.0, thus having substantially no anisotropy in longitudinal and lateral directions.

Here, MFR, lateral/longitudinal ratio of linear expansion ratio and impact strength were measured according to the following methods.

Measurement of MFR (1) Measuring machine: melt indexer
(2) Orifice inner diameter: 2 mm
(3) Sample weight 7 g
(4) Measuring weight 2 16 kg
(5) Measuring temperature: 280° C.
(6) Piston directing rod (stopper): 110 mm length
(7) Operation: During preheating time of 300 seconds, the sample was pressed under a piston (under load) of which movement was stopped by the piston directing rod, and then the molten sample extruded after removal of the piston directing rod was left to flow for 30 seconds, and the molten sample extruded for 60 seconds thereafter was collected and its weight is measured.

Method for measurement of lateral/longitudinal ratio of linear expansion ratio A flat plate of 120 mm length×120 mm width×4 mm thickness was prepared by injection molding, and test strips of 100 mm×9 mm width×4 mm thickness were cut out from the flow direction of resin (longitudinal) and the direction perpendicular thereto (lateral) from the central portion of the flat plate, and the linear expansion ratios between 23° C. and 80° C. were measured, and their lateral/longitudinal ratios were determined.

Method for measurement of Izod impact strength

According to ASTM-D 256.

COMPARATIVE EXAMPLES 1 TO 6

In the same manner as in Examples 1 to 4 except for changing the amounts of the respective component as shown in Table 1, test strips were molded. Regarding these samples, the same measurements were carried out as in Examples 1 to 4. The results are shown in Table 1.

TABLE 1

| | Composition (parts by weight) | | | | Kneading temperature (°C.) | MFR of pellets (g/10 min) | Linear expansion ratio lateral/longitudinal ratio | Izod impact resistance (kg · cm/cm) |
|---|---|---|---|---|---|---|---|---|
| | (a) Polycarbonate | (b) Glass fiber | (c-1) Brominated polystyrene fine particles | Acetylene black | | | | |
| Example 1 | 63 | 37 | 3 | — | 300 | 18 | 1.08 | 13 |
| Example 2 | 55 | 45 | 2 | — | 300 | 10 | 1.03 | 12 |
| Example 3 | 40 | 60 | 2 | — | 300 | 8 | 1.02 | 11 |
| Example 4 | 60 | 40 | 2 | 2 | 300 | 15 | 1.01 | 13 |
| Comparative example 1 | 73 | 27 | — | — | 300 | 13 | 1.65 | 13 |
| Comparative example 2 | 73 | 27 | 3 | — | 270 | 4 | 1.55 | — |
| Comparative example 3 | 55 | 45 | 2 | — | 270 | 2.5 | 1.46 | — |
| Comparative example 4 | 55 | 45 | — | — | 300 | 8 | 1.51 | 11 |
| Comparative example 5 | 40 | 60 | — | — | 300 | 6 | 1.40 | 9 |
| Comparative example 6 | 28 | 72 | 3 | — | 300 | — | — | 2 |

EXAMPLES 5 TO 8

A polycarbonate, short glass fibers with an average diameter of 8 μm and an average length of 1.5 mm and zinc sulfide fine particles with an average particle size were blended at various ratios and then formed into pellets by kneading through a twin screw extruder to be formed into pellets. The average length of the glass fibers in the pellets was found to be 0.3 mm. The resulting pellets were molded into test strips by means of a screw in-line type injection molding machine for evaluation of physical properties according to the same methods as in the foregoing examples. The results are shown in Table 2.

The compositions of Examples had lateral/longitudinal ratios of linear expansion ratio extremely approximate to 1.0, thus having substantially no anisotropy in longitudinal and lateral directions.

COMPARATIVE EXAMPLES 7 TO 12

In the same manner as in Examples 5 to 8 except for changing the amounts of the respective component as shown in Table 2, test strips were molded. Regarding these samples, the same measurements were carried out as in Examples 5 to 8. The results are shown in Table 2.

EXAMPLES 9 TO 13

A polycarbonate resin, short glass fibers with an average diameter of 9 μm and an average length of 1.5 mm, melaminecyanuric acid adduct (MCA) fine particles with an average particle size of 0.6 μm subjected to surface treatment or without treatment were blended at various ratios, and then formed into pellets by kneading through a twin screw extruder. The glass fibers in the pellets were found to have an average length of 0.3 mm. The pellets obtained were molded into test strips by using a screw in-line type injection molding machine for evaluation of physical properties according to the methods as in the foregoing Examples. The results are shown in Table 3.

The compositions of Examples had lateral/longitudinal ratios of linear expansion ratio extremely approximate to 1.0, thus having substantially no anisotropy in longitudinal and lateral directions.

The MCA was obtained according to the following method.

An amount 98.2 g of melamine, 100.6 g of isocyanuric acid (molar ratio 1:1) and 28.5 g of a polycarbonate were charged into a four-necked flask equipped with a condenser and a stirrer, further a solvent mixture comprising 2000 g of tetrahydrofuran and 222 g of water

TABLE 2

| | Composition (parts by weight) | | | Kneading temperature (°C.) | MFR of pellets (g/10 min) | Linear expansion ratio longitudinal ratio | Izod impact resistance (kg · cm/cm) |
|---|---|---|---|---|---|---|---|
| | (a) Polycarbonate | (b) Glass fiber | (c-2) Zinc sulfide | | | | |
| Example 5 | 63 | 37 | 7 | 260 | 45 | 1.01 | 14 |
| Example 6 | 55 | 45 | 2 | 300 | 28 | 1.03 | 11 |
| Example 7 | 40 | 60 | 0.5 | 300 | 20 | 1.02 | 10 |
| Example 8 | 60 | 40 | 3 | 260 | 30 | 1.03 | 12 |
| Comparative example 7 | 73 | 27 | — | 300 | 20 | 1.41 | 14 |
| Comparative example 8 | 73 | 27 | — | 260 | 12 | 1.51 | — |
| Comparative example 9 | 55 | 45 | 0.2 | 260 | 16 | 1.33 | 12 |
| Comparative example 10 | 55 | 45 | 0.2 | 300 | 12 | 1.38 | — |
| Comparative example 11 | 40 | 60 | 11 | 260 | 68 | 1.46 | 10 |
| Comparative example 12 | 28 | 72 | 3 | 300 | — | — | 3 | was added and then heating was initiated under stirring. After the temperature in the system reached 62° C. in about one hour, the mixture was aged at the same temperature for one hour and 20 minutes to complete the reaction. Subsequently, the solvent was filtered off, and the product was dried under reduced pressure at 50° C. for 5 hours, followed by pulverization to give a melamine-cyanuric acid adduct subjected to surface treatment.

In the above reaction, the same reaction was carried out except for removing the polycarbonate and tetrahydrofuran to give a melamine-cyanuric acid adduct without surface treatment.

COMPARATIVE EXAMPLES 13 TO 17

In the same manner as in Examples 9 to 13 except for changing the amounts of the respective component as shown in Table 3, test strips were molded. Regarding these samples, the same measurements were carried out as in Examples 9 to 13. The results are shown in Table 3.

(b) 70 to 35 parts by weight of glass fibers with an average diameter of 3 to 15 μm, and (c) 0.01 to 15 parts by weight, based on 100 parts by weight of the total amount of compounds (a) and (b), of at least one component selected from the group consisting of:

(c-1) 1 to 8 parts by weight of a brominated polystyrene with an average particle size of 0.1 to 50 μm;

(c-2) 0.3 to 10 parts by weight of zinc sulfide with an average particles size of 0.1 to 50 μm;

(c-3) 0.01 to 5 parts by weight of a melamine-cyanuric acid adduct with an average particle size of 0.1 to 50 μm, wherein said polycarbonate composition has a melt flow rate of from 5 to 50 g/10 min, and said injection-molded product has a lateral-longitudinal ratio of linear expansion ratio of 1.12 or lower.

2. The injection-molded product according to claim 1, wherein the glass fibers have an average diameter of 5 to 10 μm.

TABLE 3

| | Composition (parts by weight) | | | | Kneading temperature (°C.) | MFR of pellets (g/10 min) | Linear expansion ratio lateral/ longitudinal ratio | Izod impact resistance (kg · cm/cm) | Injecting pressure at molding (kg/cm²) |
|---|---|---|---|---|---|---|---|---|---|
| | (a) Polycarbonate | (b) Glass fiber | (c-3) Melamine-cyanuric acid adduct Surface treatment None | Done | | | | | |
| Example 9 | 65 | 35 | 5 | — | 240 | 48 | 1.12 | 14 | 600 |
| Example 10 | 54 | 46 | 0.01 | — | 240 | 30 | 1.09 | 12 | 750 |
| Example 11 | 54 | 46 | 0.1 | — | 240 | 36 | 1.06 | 13 | 650 |
| Example 12 | 54 | 46 | — | 0.1 | 240 | 39 | 1.07 | 15 | 620 |
| Example 13 | 40 | 60 | 2 | — | 240 | 43 | 1.04 | 11 | 650 |
| Comparative example 13 | 73 | 27 | — | — | 300 | 13 | 1.52 | 13 | 1000 |
| Comparative example 14 | 54 | 46 | — | — | 240 | 5 | 1.48 | 12 | 1200 |
| Comparative example 15 | 54 | 46 | 8 | — | 240 | 58 | 1.32 | 5 | 550 |
| Comparative example 16 | 40 | 60 | — | — | 300 | 8 | 1.38 | 9 | 1200 |
| Comparative example 17 | 28 | 72 | 5 | — | 240 | 30 | 1.21 | 1 | 700 |

EXAMPLES 14 AND 15

In addition to the same polycarbonate resin, glass fibers and melamine-cyanuric acid adduct (MCA) used in Example 9, using the same brominated polystyrene fine particles as in Example 1 or the same zinc sulfide as in Example 5, compositions are formulated respectively with the composition ratio shown in Table 4. These compositions were evaluated in the same manner as in Example 9. The results are shown in Table 4.

3. The injection-molded product according to claim 1, wherein the brominated polystyrene has a bromine content of 50 to 80%.

4. The injection-molded product according to claim 1, wherein the brominated polystyrene is in the form of spherical fine particles with an average particle size of 1 to 30 μm.

5. The injection-molded product according to claim 2, wherein the brominated polystyrene is in the form of spherical fine particles with an average particle size of 1 to 30 μm.

TABLE 4

| | Composition (parts by weight) | | | | | Kneading temperature (°C.) | MFR of pellets (g/10 min) | Linear expansion ratio lateral/ longitudinal ratio | Izod impact resistance (kg · cm/cm) | Injecting pressure at molding (kg/cm²) |
|---|---|---|---|---|---|---|---|---|---|---|
| | (a) Polycarbonate | (b) Glass fiber | (c-1) Brominated polystyrene fine particles | (c-2) Zinc sulfide | (c-3) Melamine cyanuric acid adduct | | | | | |
| Example 14 | 55 | 45 | 2 | — | 0.1 | 240 | 30 | 1.03 | 16 | 650 |
| Example 15 | 40 | 60 | — | 1.5 | 0.1 | 240 | 45 | 1.02 | 14 | 600 |

We claim:

1. An injection-molded product, comprising a polycarbonate composition composed of:

(a) 30 to 65 parts by weight of a thermoplastic aromatic polycarbonate,

6. The injection-molded product according to claim 3, wherein the brominated polystyrene is in the form of spherical fine particles with an average particle size of 1 to 30 μm.

7. The injection-molded product according to claim 1, wherein the zinc sulfide is in the form of fine particles with an average particle size of 0.2 to 20 μm.

8. The injection-molded product according to claim 2, wherein the zinc sulfide is in the form of fine particles with an average particle size of 0.2 to 20 μm.

9. The injection-molded product according to claim 1, wherein the melamine-cyanuric acid adduct has an average particle size of 0.2 to 30 μm.

10. The injection-molded product according to claim 2, wherein the melamine-cyanuric acid adduct has an average particle size of 0.2 to 30 μm.

11. The injection-molded product according to claim 1, wherein the amount of the thermoplastic aromatic polycarbonate is from 40 to 60 parts by weight and the amount of the glass fibers is from 60 to 40 parts by weight, provided that the total amount of the both components is 100 parts by weight.

12. The injection-molded product according to claim 1, wherein the amount of the zinc sulfide formulated is from 1 to 8 parts by weight.

13. The injection-molded product according to claim 1, wherein the amount of the melamine-cyanuric acid adduct formulated is from 0.01 to 3 parts by weight.

14. The injection-molded product of claim 1, wherein component (c) is 1 to 8 parts by weight of a brominated polystyrene with an average particle size of 0.1 to 50 μm.

15. The injection-molded product of claim 1, wherein component (c) is 0.3 to 10 parts by weight of zinc sulfide with an average particle size of 0.1 to 50 μm.

16. The injection-molded product of claim 1, wherein component (c) is 0.01 to 5 parts by weight of a melaminecyanuric acid adduct with an average particle size of 0.1 to 50 μm.

17. The injection-molded product of claim 1, wherein said melt flow rate is 8 to 40 g/10 min.

18. The injection-molded product of claim 1, wherein said lateral-longitudinal ratio of linear expansion ratio is 1.09 or lower.

19. The injection-molded project of claim 18, wherein said lateral-longitudinal ratio of linear expansion ratio is 1.09 or lower.

* * * * *